United States Patent [19]

Dolengowski

[11] Patent Number: 4,648,479

[45] Date of Patent: Mar. 10, 1987

[54] MULTIPLE-PORT, MULTIPLE-CHAMBER, TUNED AIR-POWERED SUBSEA SEISMIC SOURCE

[75] Inventor: George A. Dolengowski, Stafford, Tex.

[73] Assignee: Exxon Production Research Co., Houston, Tex.

[21] Appl. No.: 537,771

[22] Filed: Sep. 30, 1983

[51] Int. Cl.⁴ .................. G01V 1/137; G01V 1/38
[52] U.S. Cl. .................... 181/120; 181/110; 181/118; 181/402; 277/27; 277/65; 367/144
[58] Field of Search .............. 181/118, 120, 110, 402, 181/106, 111, 113, 115, 119, 139, 142; 367/144; 277/27, 81 R, 95, 96, 65, 96.1, 96.2

[56] References Cited

U.S. PATENT DOCUMENTS

| | | | |
|---|---|---|---|
| 2,688,981 | 9/1954 | Greer et al. | 277/27 X |
| 3,638,752 | 2/1972 | Wakefield | 181/120 |
| 3,653,460 | 4/1972 | Chelminski | 181/120 |
| 3,658,149 | 4/1972 | Neal et al. | 181/118 |
| 4,103,903 | 8/1978 | Capriotti et al. | 277/27 |
| 4,141,431 | 2/1979 | Baird | 181/110 X |
| 4,180,139 | 12/1979 | Walker | 181/115 X |
| 4,193,472 | 3/1980 | Kirby | 367/147 X |
| 4,211,300 | 7/1980 | Miller | 367/144 X |
| 4,230,201 | 10/1980 | Bays | 181/118 X |
| 4,268,232 | 5/1981 | Haupt | 277/27 X |
| 4,324,311 | 4/1982 | Farris | 181/120 |
| 4,381,044 | 4/1983 | Kirby | 181/118 |
| 4,413,830 | 11/1983 | Pietsch | 277/65 X |
| 4,503,929 | 3/1985 | Farris et al. | 181/118 |
| 4,556,120 | 12/1985 | Kirby | 181/120 |

FOREIGN PATENT DOCUMENTS 0656009 4/1979 U.S.S.R. .............. 181/118

Primary Examiner—Deborah L. Kyle
Assistant Examiner—John E. Griffiths
Attorney, Agent, or Firm—Eugene T. Wheelock; Keith A. Bell

[57] ABSTRACT

The invention is a multi-port, multi-chamber, tuned, air-powered subsea seismic source. It is suitable for producing a seismic wave in a subsea environment during seismic prospecting. Interconnected pressurized chambers are formed between plates located on a movable shuttle and cylinder walls extending inward from the source housing. The source is fired by moving the shuttle through a stroke and allowing the pressurized air within the air chambers to exit through ports into the surrounding water. A unique seal arrangement in also shown.

7 Claims, 8 Drawing Figures

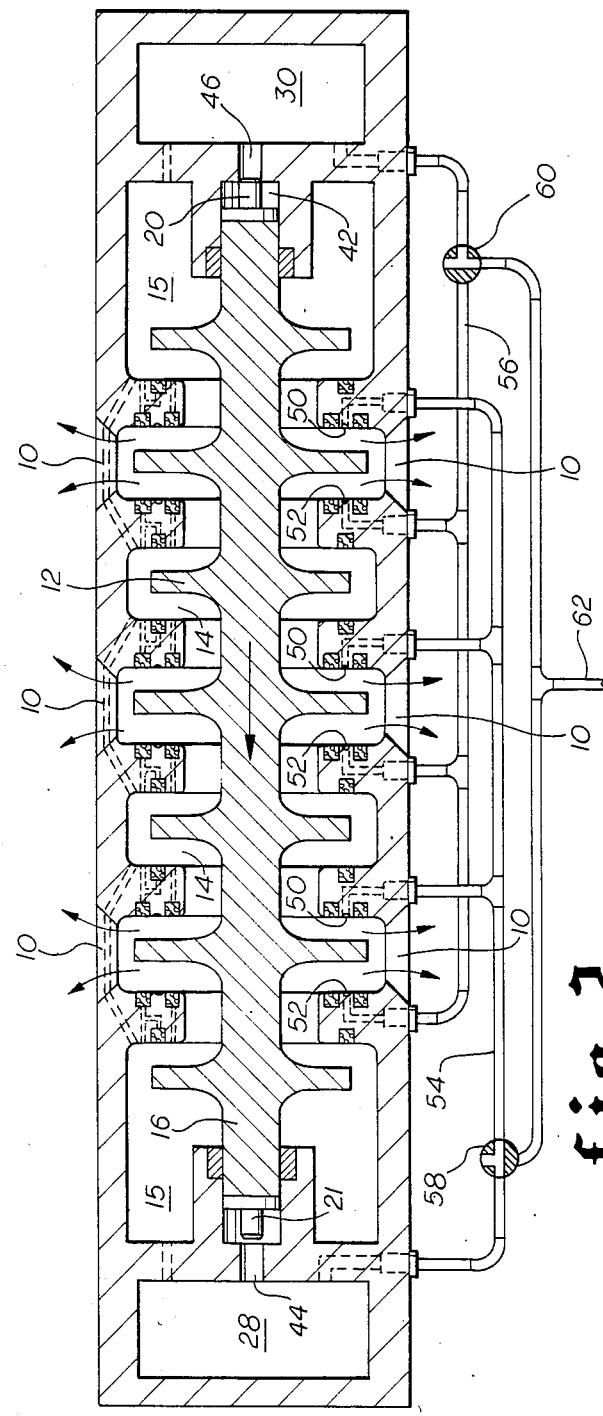
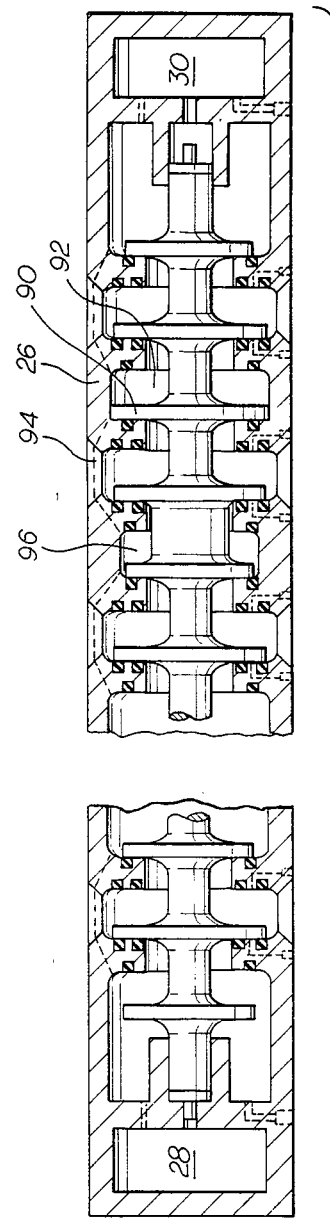
fig. 2
fig. 4

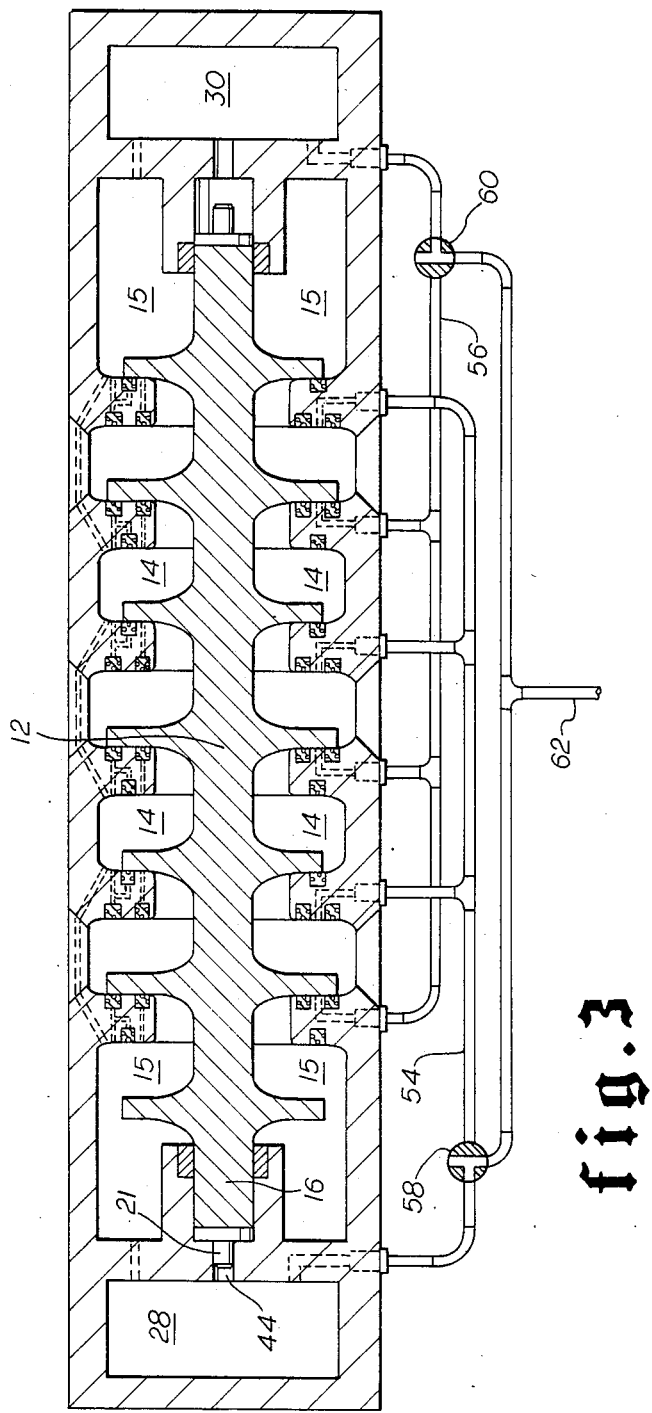
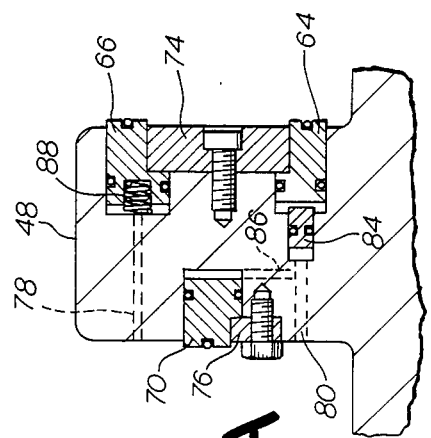
fig. 3
fig. 3A

MULTIPLE-PORT, MULTIPLE-CHAMBER, TUNED AIR-POWERED SUBSEA SEISMIC SOURCE

OBJECT OF THE INVENTION

This invention relates to an improved seismic energy source used to create pulses or shock waves in a liquid medium such as water. More particularly, it relates to a simple air-powered apparatus which is easily operated, reliable, and whose signature and frequency spectrum can easily be modified. The source uses a single reversible shuttle which simultaneously releases pressurized air from a number of chambers.

BACKGROUND OF THE INVENTION

In prospecting in subsea and other areas underlying a body of water, it is desirable to provide a source of energy for propagating sonic pulses or shock waves into the water. Since water is a good conductor of sound, it normally is not necessary to generate pulses near the floor of the waterbody; the pulses can be, and desirably are, produced near the water's surface. These pulses propagate down through the water, across the water-floor interface, into the subfloor geologic formations and are, to some extent, reflected back across the same path to an array of hydrophones waiting near the surface of the water. Analysis of the signals produced by the hydrophones can provide information concerning the structure of the subfloor geological formations and attendant petroleum accumulation in those formations.

The term "water" as used herein is meant to include swampwater, mud, marshwater and any other liquid containing sufficient water to enable operation of the invention.

There are many ways of generating a seismic pulse in a liquid. For instance, explosives introduce strong pulses into the water and accordingly achieve substantial penetration into subfloor formations. Certain obvious drawbacks exist in their use: they are dangerous to store, handle, and use. When used in open water they kill marine life. In crowded areas such as harbors, explosives cannot be used at all. Explosives are orders of magnitude more expensive to use, on a per-shot basis, than are air guns. Modification of the explosive source sonic signature to achieve an acceptable spectrum distribution is difficult.

Another method of generating a sonic pulse is by discharge of a bank of capacitors through a subsurface electrode to produce a quickly collapsing gaseous bubble. However, the efficiency of this method is quite low in that only a few percent of the energy charged to the capacitors is found in the shock wave produced on discharge.

Apparatus using explosive gas mixtures, e.g., propane and air, to produce the sonic pulse have gained wide acceptance. The two major types of explosive gas guns are those which operate by exploding a gas mixture behind a flexible membrane which in turn is in contact with the water and those which operate by allowing the abrupt bubble from the gas explosion to pass directly into the water. An example of the former apparatus can be found in U.S. Pat. No. 3,658,149; an example of the latter can be found in U.S. Pat. No. 4,193,472.

Open air guns using high pressure compressed air, instead of an explosive mixture, have achieved a wide acceptance in the industry. Typical designs for open-ported compressed air guns are found in U.S. Pat. No. 3,653,460 to Chelminski and U.S. Pat. No. 4,141,431 to Baird. These guns employ two pressurized chambers, i.e., a control chamber and an air-holding chamber, which are sealed by a spool-shaped valve or shuttle. The gun is fired by abruptly releasing air from the control chamber. The air in the air-holding chamber forces the shuttle into the control chamber and thereby simultaneously exposes the exhaust ports. These ports allow the air stored in the air-holding chamber to exit explosively into the water. The control chamber is then re-pressurized, thereby moving the shuttle back into a position sealing the air-holding chamber. The gun is again ready to "fire."

Guns employing this design have certain liabilities which are quite difficult to correct. The period during which the exhaust ports are open after escape of the initial burst of pressurized air is one in which no useful operation is performed. The initial burst of air through the exhaust port is the one which produces the useful portion of the shock wave. Obviously the air lost from the exhaust ports during the repositioning of the shuttle is wasted. The apparatus of the invention disclosed herein consumes a significantly smaller amount of compressed air than do those of the prior art having a shuttle which must reverse itself prior to firing. The mechanical stress on the shuttle of the invention is much less than on the reversing shuttle of the prior art.

A gun which uses compressed air and eliminates several problems associated with prior guns is disclosed in U.S. Pat. No. 4,180,139 to Walker, issued in Dec., 1979, U.S. Pat. No. 4,211,300 to Miller, issued in July 8, 1980, and U.S. Pat. No. 4,324,311, to Farris, issued Apr. 13, 1982. These patents disclose a gun having a single cylindrical air chamber with central exhaust ports about its periphery. Inside the air chamber resides a moveable shuttle also having ports about its center. When the shuttle is moved from one end of the air chamber to the other end, via the action of an integrated actuator, the ports in the shuttle momentarily align with those in the air chamber wall and allow an amount of compressed air to escape. Once the shuttle reaches the other end, the gun is in position to "fire" again awaiting only the build-up of pressure in the air chamber and actuating mechanism. Although this device has a number of advantages over those of the prior art, e.g., efficient compressed air usage, the geometry of the device precludes any reasonably facile alteration in the frequency and spectrum distribution of the sonic pulse it produces. The two physical dimensions of the gun, i.e., exhaust port geometry and air chamber size, defining the signature of the sonic pulse cannot be changed in the field without substantial effort.

A seismic source using a single shuttle to seal two air storage cylinders and subsequently release the compressed air contained in those cylinders is shown in U.S. Pat. No. 4,381,044 to Kirby, issued on Apr. 26, 1983.

SUMMARY OF THE INVENTION

The invention's seismic source has a number of pressurized chambers within the gun assembly. The chambers are separated by ports which allow the passage of the pressurized air contained in the chambers out into the surrounding waterbody.

The pressurized chambers are closed by plates mounted on a shuttle located within the gun assembly. The shuttle moves through a stroke and seals each of the chambers at the ends of the stroke. During the stroke, the chambers are all interconnected about the edge of the shuttle plates.

The shuttle is sealed on the chamber walls by a unique arrangement of seals. For a particular chamber wall, one side is sealed with a double seal dispersed about the shuttle. The other side is sealed with a single seal. The included surface area defined by the single seal is between the areas of the other two seals. A compressed air inlet port is located between the two seals. Although the word "air" is used throughout the specification, the term is intended to include any available compressed gas.

When a chamber is pressurized, the air tends to keep the shuttle closed because of the difference between the circumscribed area of the single seal and the larger of the double seals. The shuttle is fired by introducing compressed air into an inlet port located between the double seals.

The exhaust ports may be sized and located so that the air bubbles may interact or coalesce upon firing. This feature, along with a choice of chamber size, allows this inventive source to act as a complete array.

BRIEF DESCRIPTION OF THE DRAWINGS

FIG. 2 is another cross sectional side view of the inventive source showing the shuttle in the firing position.

FIG. 3 is another cross sectional side view of the inventive source showing the shuttle at the left end of the stroke.

FIG. 3A is a cross section of a seal arrangement in a cylinder wall.

FIG. 4 is a cutaway side view of the inventive device showing the manner in which the device may be extended to any number of pressurized chambers, showing a chamber of decreased volume, and one method isolating pressurized chambers within the device.

DESCRIPTION OF THE PREFERRED EMBODIMENTS

The preferred embodiment of the air-powered seismic device has a number of pressurized air chambers formed between the gun frame, or housing, and a shuttle located within the housing. Movement of the shuttle from one position to another allows the accumulated pressurized air to escape through ports formed on the outside of the housing, escape out into the surrounding water, and thereby produce a seismic pulse. The shuttle itself is made up of a central shaft and has several plates extending generally perpendicularly from the axis of the shaft which are spaced and sized to contact seals mounted on projections or cylinder walls extending inwardly from the outer wall of the gun housing. The shuttle is preferably supported by bearings or bushings located at each end of the shuttle shaft.

The gun housing includes high pressure accumulator chambers which are located at each end of the device housing and are used primarily, with some small actuation chambers located at each end of the shuttle shaft, to urge the shuttle through a complete stroke. There is also some associated valving and air feed means necessary for the proper operation of the device.

Figure 1:
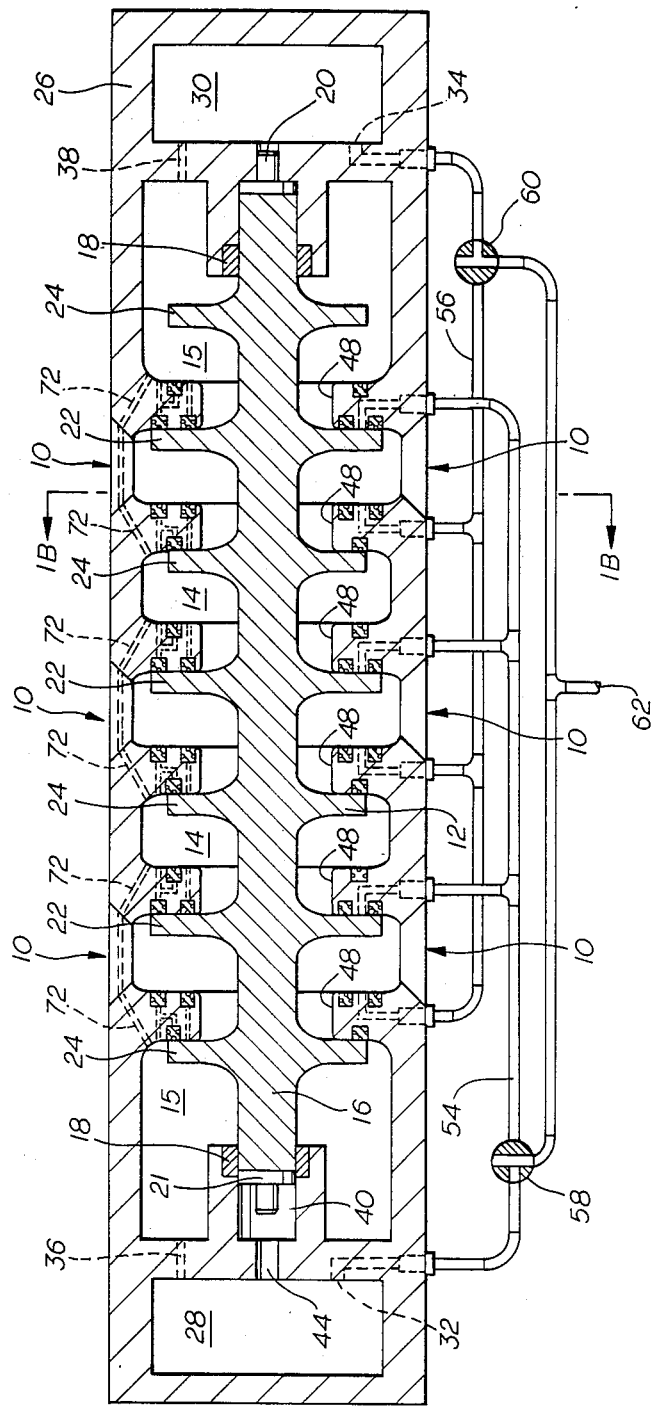
FIG. 1 is a cross sectional side view of the inventive source with the shuttle in the right end of the stroke.

One embodiment of the inventive source is shown in cross sectional side view in FIG. 1. This variation utilizes three port locations 10 and a total of four pressurized air chambers 14, 15. Two of such pressurized air chambers are located along the shuttle 12 at 14, and the other two pressurized air chambers are located nea the ends of shuttle 12 at 15. The ports 10 are shown in the FIGURES as being machined. However, holes through gun housing 26 wall may be threaded to accept port inserts having any appropriately sized hole therethrough. Shuttle 12 is depicted in FIG. 1 at the right end of its stroke. Shuttle 12 is made up of a central shaft 16 which is supported at each end by shuttle support bearing or bushing 18. Each end of the shuttle shaft 16 has mounted thereon respectively right and left shuttle plungers 20 and 21. The function of the plunger is described in more detail below. Also mounted on the shuttle shaft are a number of shuttle plates some of which are of larger diameter 22 and some of smaller diameter 24. These plates may alternately be of the same size. Shuttle plates 22 and 24 are generally round and preferably mounted so that their diameters are approximately perpendicular to the axis of the shuttle shaft 16. The size of the shuttle plates is selected to match up with seals mounted in the source housing 26 as discussed below.

As mentioned above, gun housing 26 has, at its opposite ends, a left accumulator chamber 28 and a right accumulator chamber 30. Left accumulator chamber 28 has a pressurized air inlet port 32; right pressure chamber 30 has a similar inlet port 34. Each of the accumulation chambers is connected to adjacent pressure chambers by left and right orifice inlets 36 and 38 respectively. Each of the accumulation chambers is also in communication with an actuation chamber. Left actuation chamber 40 is shown in FIG. 1 and communicates with left accumulation chamber 28 via left plunger receiver 44.

Extending inwardly from the outside wall of the gun housing 26 are a number of pressurized cylinder walls 48. The pressurized cylinder walls are generally circular in shape but having a large opening through their middles to permit the passage of shuttle shaft 16 and the flow of pressurized air from pressurized chambers, such as 14 or 15, and out through ports 10. FIG. 1A shows, in detail, the most desired configuration of seals in a pair of adjacent cylinder walls 48 surrounding a typical port 10. FIG. 1A also shows firing port 50 which assists in moving the shuttle to the left and firing port 52 which assists in moving the shuttle to the right. As shown in FIG. 1, all of the left firing shuttle ports (those moving the shuttle to the left) are manifolded together by sub-manifold 54 and those firing ports provided to move the shuttle to the right are tied together to sub-manifold 56. Left three-way valve 58 and right three-way valve 60 are tied to the two sub-manifolds and the pressurized air inlet ports 32 and 34 opening respectively in the two accumulator chambers 28 and 30 in the manner depicted; valves 58 and 60 distribute pressurized air from air inlet 62 in a manner to be described below.

Figure 1B:
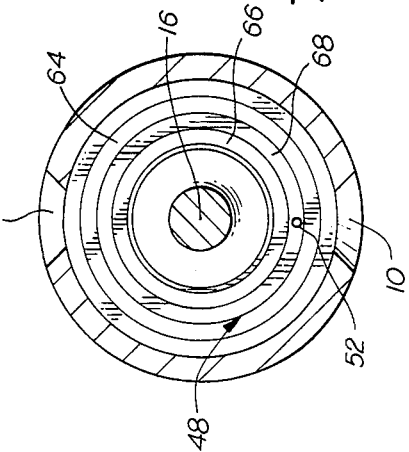
FIG. 1B is a cross sectional detail of the source taken across its diameter at station 1B.
Figure 1A:
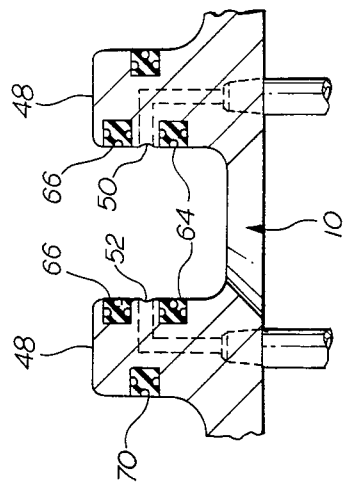
FIG. 1A is a cross sectional detail, taken along the axis of the source, of an exhaust port and its adjacent cylinder walls and the included seals.

FIG. 1B shows a cross section across the axis of the device taken at station 1B in FIG. 1. Located in the center is shuttle shaft 16. Surrounding the shaft is the opening through which air from, e.g., pressurized chamber 14 or 15, passes in exiting the device through port 10. Included on cylinder wall 48 are two seals: an outer or firing seal 64 and an inner or small seal 66. As will be explained below, the device is fired by introducing compressed air into firing port 52 which exits into a small firing groove 68. FIG. 1A shows a cross section of cylinder wall 48 showing firing seal 64, small seal 66, and firing port 50 or 52 in between. The seal on the opposite side of cylinder wall 48 is shown at 70. The seals shown in FIG. 1A have O-rings depicted in their respective faces. Those O-rings are not shown in FIG. 1B to maintain the relative simplicity of the drawing. For the same reason, the seal retainers discussed below with respect to FIG. 3A are not shown in either of FIGS. 1A or 1B.

The device operates in the following way: High pressure air is continuously supplied through pressurized air inlet 62. The air fills both left accumulator chamber 28 and right accumulator chamber 30 through the respective inlet ports 32 and 34. Air flows are controlled by three way valves 58 and 60. Chamber 15 at the left end of the shuttle is filled with pressurized air through orifice inlet 36. Similarly, pressurized chamber 15 at the right end of shuttle 12 is filled through orifice inlet 38 from right accumulator chamber 30. In each case there may also be leakage past bearings 18 into the respective left and right end chambers. The middle pressurized air chambers 14 along the shuttle 16 are also pressurized by high pressure air flow through a series of air passageways 72 linking chambers 15 with chambers 14 or chambers 14 with other chambers 14. It should be apparent that although the air passageways are preferably within the gun housing 26 for purposes of reliability, the high pressure air passageways 72 need not be placed within gun housing 26. They may be configured as external lines placed outside the gun housing. Alternately the chambers 14 and 15 and the left and right accumulator chambers 28 and 30 may be parallel-fed with separate lines. When an appropriate pressure in the chambers is reached, the device is ready to fire. Note that in FIG. 1 shuttle 12 is at the right end of the stroke with the small shuttle plates 24 sitting against the single seal face of cylinder wall 48 and the large shuttle plates are sitting at or near the face of the cylinder wall 48 having double seals mounted therein. The additional force of the pressurized air within the air chambers against the area inside of single seal 70 as compared to the force by that same air upon the area inside inner or small seal 66 keeps the shuttle cocked in the right hand position. The device is shown, during firing, in FIG. 2. Left three way valve 58 has been turned to interconnect accumulator chamber 28 with the firing ports 50. The air passes through sub-manifold 54. The additional area which is then included by firing seal 64 (shown in FIG. 1A) tends to move the shuttle 12 in the direction shown to the left. Compressed air escapes through various ports 10. As noted above, the ports and chambers of the inventive device may be sized and placed in such a manner that they produce pulses of various fundamental frequencies. They may also be designed so that the bubbles emitting through ports 10 interact or coalesce and form bubbles collectively producing a flatter or broader spectrum.

In completing the stroke, right three way valve 60 allows inflow of fresh high pressure air to accumulator 30. This permits flow of high pressure air from air inlet 62 through three way valve 60 and into accumulator chamber 30. Pressurized air will pass through accumulator chamber 30, through right plunger receiver 46, into right actuator chamber 42, and press against the right shuttle plunger 20 mounted on the right end of shuttle 12 and also the end of shuttle shaft 16. Once the shuttle left plunger 21 at the left end of shuttle 12 is seated in left plunger receiver 44 (as shown in FIG. 3) then left three way valve 58 may be moved to the position shown in FIG. 3. The plunger receivers are configured to help cut off extraneous air flow during the stroke. With shuttle 12 in the left hand position shown in FIG. 3, pressurization of left and right accumulator chambers 28 and 30 may then begin anew. This will in turn pressurize the volumes formed in high pressure chambers 14 and 15. Upon reaching a suitable pressure, the three way valves may then be reconfigured in a similar manner to that discussed above and the shuttle moved through its stroke to return to the right hand position shown in FIG. 1.

The seals used in the inventive seismic source need not be of any particular style. They should, however, extend slightly out from the faces of cylinder walls 48. One desirable configuration is shown in FIG. 3A, although seal 66 is shown with an alternative spring loaded seal. Each of the seals 64, 66, and 70 is fitted into a matching groove within the face of cylinder wall 48. They fit tightly enough within the groove, in conjunction with the illustrated O-rings, to allow high pressure air coming from a nearby pressurized chamber, e.g., 14 or 15, to push the various seals out to meet the small or large shuttle plates. For instance, in the case where a large shuttle plate is adjacent to seal 64 and 66, held in place by dual seal retainer 74, high pressure air would pass through seal air passage 78 and urge seal 66 outward. Similarly, high pressure air would pass through seal air passage 80 to push firing seal 64 outward. Auxiliary seal 84 cooperates with seal air passage 80 in such a manner that passage 80 may be used both to pressure seal 64 and seal 70. When a small shuttle plate rests adjacent to seal 70, pressurized air will flow through passage 80, through passage 86, and extend seal 70 out to meet the small shuttle plate. It should be apparent that the small shuttle plate should not extend out from the center of the source to the region where the bolt holding single seal retainer 76 protrudes from the face of cylinder wall 48. As mentioned above, these seals desirably use air to provide extension from the face of cylinder wall 48. However, a spring seal may be used either alone or in conjunction with this air lift system. The spring 88 may be placed as depicted in FIG. 3A.

FIG. 4 shows a manner in which any number of pressurized air chambers may be linked together in a single source. An oversized shuttle plate 90 is also shown. Shuttle plate 90 fits closely within the interior wall of gun housing 26 and in this way is capable of effectively isolating pressurized air chamber 92 from port 94. As mentioned above, the configuration shown in FIGS. 1, 2, and 3 allows intercommunication between each of the pressurized air chambers and the exhaust ports. If, for tuning purposes, isolation of a portion of the pressurized source is desired, then providing an oversized shuttle plate such as 90 is a method of doing so.

Similarly, if higher fundamental frequency is desirable, a small pressurized air chamber as shown at 96 may be desirable.

Figure 5:
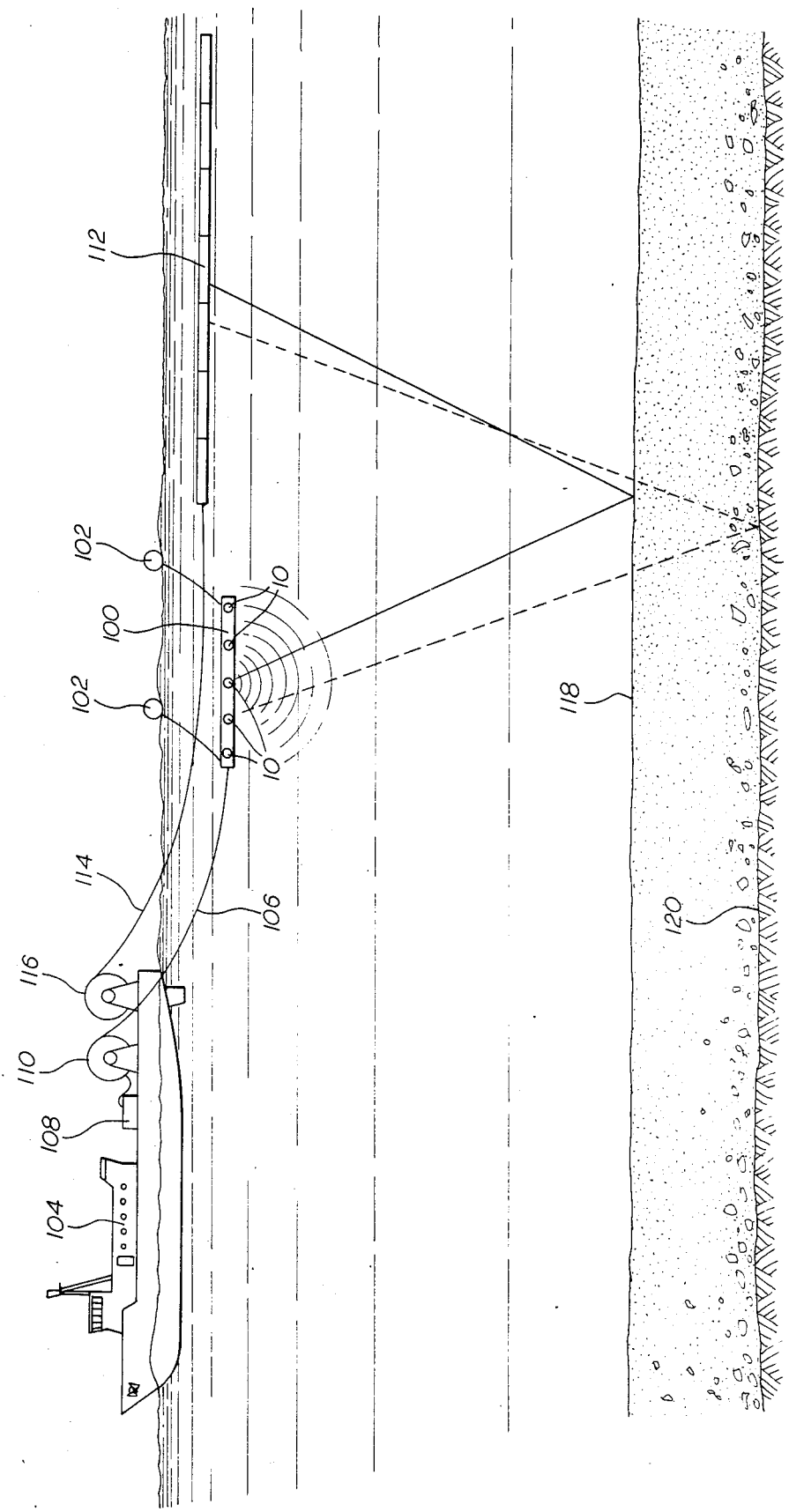
FIG. 5 is a schematic depiction of the inventive source as it might be deployed during geophysical prospecting.

It is common practice in this art to use a tuned array of guns, e.g., number of guns each having a single but possibly different frequency, is placed in the water to characterize an offshore geologic structure. This device may be used on shore in shallow liquid filled pits for the same purpose. By proper configuration of ports and chambers in the inventive device, the seismic spectrum may be tailored so that only one such source is required. Even if two or three are necessary for proper characterization of the geologic structure in question, the simplicity of the attendant air lines and handling devices should be apparent. FIG. 5 schematically depicts the use of a single seismic source 100 built according to the instant description. It is supported in the water by buoys 102 and pulled along by seismic boat 104 via tow cable 106. Air compressor 108 is also shown. Air lines extend from air compressor 108 up to reel 110 and thence along tow cable 106 to source 100. Seismic boat 104 also pulls along a segmented streamer cable 112 which may contain a thousand or more hydrophones. The hydrophones are intended to receive seismic waves reflected from subsea geologic structures. The streamer cable is often filled with an oil giving it a particular buoyancy and allowing it to ride beneath the surface of the water. It also is towed via cable 114 by reel 116.

The subsea seismic source 100 fires, and a number of explosive bubbles leave the source through ports 10. The seismic wave thus produced proceeds radially through the water and a portion reflects off the sea bottom at 118 and also off an interface 120 between two geologic layers having different densities. The reflective wave then travels back over a similar path to be detected by the hydrophones in streamer cable 112. The received acoustic energy is transformed via the hydrophones into electrical signals which are sent to recording devices on seismic boat 104. The recorded signals are thereafter converted, often in a different location, into "traces" or subterranean maps using high speed digital computers. The traces desirably disclose the location of subterranean formations which may contain oil or gas.

It should be understood that the foregoing disclosure and description are only illustrative and explanatory of the invention. Various changes in size, shape, materials of construction, in configuration as well as in the details of the illustrated constructions, may be made within the scope of the attached claims without parting from the spirit of the invention.

I claim as my invention:

1. A seismic cource suitable for producing a seismic wave in a liquid, said seismic source comprising:
   (a) a housing having a generally tubular body, two longitudinal ends, and a longitudinal axis, said tubular body having an inner side;
   (b) a plurality of cylinder walls extending inwardly from said inner side of said tubular body, said cylinder walls being axially spaced along said longitudinal axis between said longitudinal ends so as to define a plurality of longitudinally spaced chambers in said housing, said chambers comprising, alternatively, pressure chambers and port chambers such that each port chamber is located between two pressure chambers, each of said cylinder walls having a port chamber side, a pressure chamber side, and a central bore therethough, said central bore being substantially co-axial with said longitudinal axis;
   (c) a shuttle disposed within said housing, said shuttle being axially movable through a stroke and comprising,
      (i) a shuttle shaft passing loosely through said central bore in each of said cylinder walls so as to define an annular passageway around said shuttle shaft in each of said cylinder walls, said shuttle shaft having an axis substantially coincident with said longitudinal axis and two ends, each of said ends being supported by said housing, and
      (ii) a plurality of longitudinally spaced shuttle plates mounted on said shuttle shaft, each of said shuttle plates corresponding to and being located in one of said longitudinally spaced chambers in said housing, said shuttle plates being adapted to seal each of said pressure chambers only at each end of said storke;
   (d) one or more ports communicating through said tubular body and into each of said port chambers;
   (e) means for supplying pressurized air to said pressure chambers; and
   (f) means for moving said shuttle axially through said stroke;

whereby pressurized air in each of said pressure chambers exits through said annular passageways into said port chambers and thence through said ports to produce a seismic pulse in said liquid when said shuttle is moved through said stroke.

2. The seismic source of claim 1 wherein said housing includes an accumulator chamber at each of said longitudinal ends, said accumulator chambers being located, respectively, beyond said ends of said shuttle shaft, each of said accumulator chambers being in communication with at least one of said pressure chambers.

3. The seismic source of claim 2 wherein each of said longitudinal ends of said housing includes a generally cylindrical actuation chamber substantially co-axial with said longitudinal axis, said actuation chamber being in communication with said accumulator chamber, and wherein each of said ends of said shuttle shaft has a pressure surface formed thereon and extends, respectively, into one of said actuation chambers, whereby pressurized air in said accumulator chamber flows into said actuation chamber and presses on said pressure surface to urge said shuttle through said stroke.

4. The seismic source of claim 1 wherein each of said cylinder walls includes,
   (a) a first seal and a second seal mounted in said port chamber side of said cylinder wall so as to circumscribe said central bore, said first seal having a diameter larger than the diameter of said second seal,
   (b) a third seal mounted in said pressure chamber side of said cylinder wall so as to circumscribe said central bore, said third seal having a diameter larger than the diameter of said second seal and smaller than the diameter of said first seal, and
   (c) means for introducing pressurized air between said first seal and said second seal, said second and third seals cooperating with said shuttle plates to seal each of said pressure chambers at each end of said stroke, and wherein movement of said shuttle through said stroke is initiated by introducing pressurized air between said first and second seals in each of said cylinder walls.

5. The seismic source of claim 4 wherein each of said first, second, and third seals has a back face and a sealing face adapted to sealingly contact one of said shuttle plates at one end of said stroke, and wherein said seismic source further comprises means for extending said seals outwardly from said cylinder walls.

6. The seismic source of claim 5 wherein said means for extending said seals comprises passageways formed in said cylinder walls for supplying pressurized air from said pressure chambers to said back face of each said seal.

7. The seismic source of claim 5 wherein said means for extending said seals comprises one or more springs adapted to press outwardly on said back face of each said seal.

* * * * *